United States Patent

Tagashira et al.

[11] 3,967,220
[45] June 29, 1976

[54] VARIABLE DELAY EQUALIZER

[75] Inventors: Yoshimi Tagashira; Masaaki Atobe; Kazuhiro Yamamoto, all of Tokyo, Japan

[73] Assignee: Nippon Electric Company, Ltd., Tokyo, Japan

[22] Filed: July 31, 1975

[21] Appl. No.: 600,682

[30] Foreign Application Priority Data
Aug. 19, 1974 Japan................................. 49-94716

[52] U.S. Cl. ................................. 333/28 R; 333/10
[51] Int. Cl.² ......................... H03H 7/14; H01P 1/20
[58] Field of Search ............................ 333/10, 28 R

[56] References Cited
UNITED STATES PATENTS 3,487,337  12/1969  Kurpis et al...................... 333/28 R
3,609,599  9/1971  Standley............................ 333/28 R Primary Examiner—Paul L. Gensler
Attorney, Agent, or Firm—Sughrue, Rothwell, Mion, Zinn & Macpeak

[57] ABSTRACT

A variable delay equalizer comprises two directional couplers, each having a pair of input terminals and a pair of output terminals. A pair of variable phase shifters are inserted respectively between the output terminals of the first coupler and the input terminals of the second coupler. A third variable phase shifter is connected between the second output terminal of the second coupler and the second input terminal of the first coupler. This equalizer makes it possible to shift the peak delay frequency as well as to change the value of the peak delay itself.

1 Claim, 4 Drawing Figures

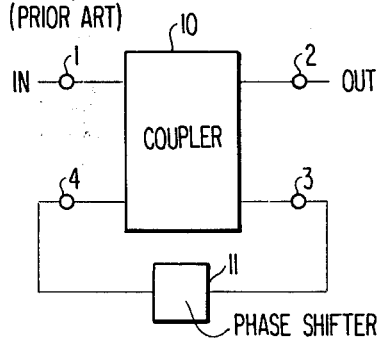
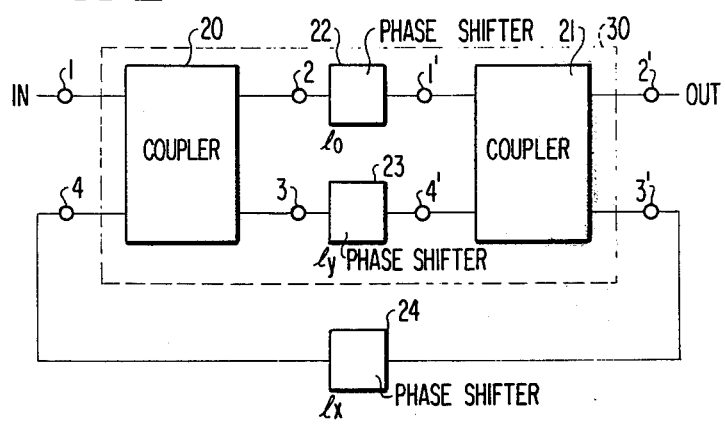

VARIABLE DELAY EQUALIZER

BACKGROUND OF THE INVENTION

1. Field of the Invention

This invention relates to variable delay equalizers for compensating for delay distortions caused in the transmission of signals over FM and PCM digital communications systems, and more particularly to variable delay equalizers of the type using a directional coupler and a variable phase shifter.

2. Description of the Prior Art

One typical prior art delay equalizer consists essentially of a directional coupler having first and second input terminals and first and second output terminals, the second output terminal being connected to the second input terminal by way of a feedback path. In this type of equalizer, the input frequency vs. delay characteristic has a peak delay at a wavelength (frequency) relevant to the length of the feedback path, and the delay tends to decrease as the frequency departs from the center of the characteristic frequency of the device. Hence, by changing the length of the feedback path, the delay of an input signal within its transmission band can be equalized. Although this approach enables the peak delay to be shifted with respect to frequency, it is nearly impossible to change the characteristic delay value itself, i.e., the peak delay time.

SUMMARY OF THE INVENTION

It is therefore an object of the invention to provide a variable delay equalizer using a variable phase shifter to make it possible to arbitrarily shift the peak-delay frequency (the center frequency of the delay) as well as to change the value of peak delay itself.

With this and other objects, in view, the invention provides a variable delay equalizer comprising first and second directional couplers each having a pair of input terminals and a pair of output terminals, first and second variable phase shifters inserted respectively between the first output terminal of said first directional coupler and the first input terminal of said second directional coupler and between the second output terminal of said first directional coupler and the second input terminal of said second directional coupler; and a third variable phase shifter inserted between the second output terminal of said second directional coupler and the second input terminal of said first directional coupler. This delay equalizer is highly practical because the delay time of its delay characteristic is changed by the first or second variable phase shifter, and the center frequency thereof is changed by the third variable phase shifter.

BRIEF DESCRIPTION OF THE DRAWINGS

The other objects, features, advantages of the invention will become more apparent from the following description when read in conjunction with the accompanying drawing, wherein:

FIG. 1 is a block diagram showing a prior art variable delay equalizer;

FIG. 2 is a block diagram showing a variable delay equalizer of the invention.

DESCRIPTION OF THE PREFERRED EMBODIMENT

Figure 3:
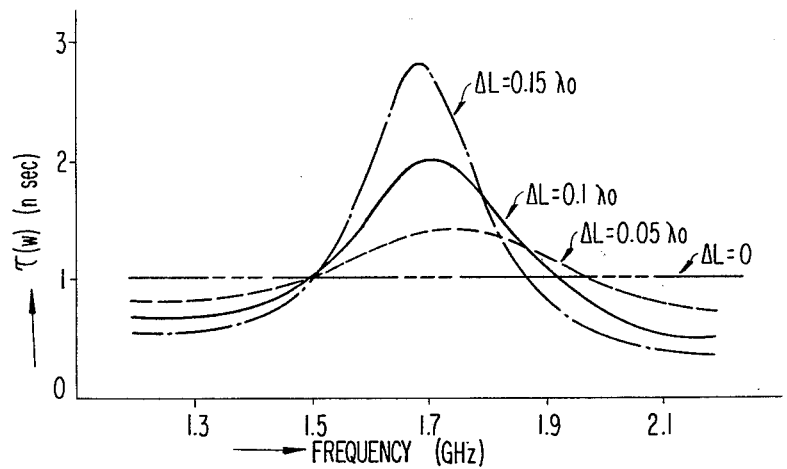
FIGS. 3 and 4 are graphs showing delay characteristics of the delay equalizer shown in FIG. 2.

With reference now to FIG. 1, there is shown in block form a prior art variable delay equalizer comprising a directional coupler 10, and a variable phase shifter 11 inserted between an output terminal 3 and an input terminal 4 of the directional coupler 10. In this type of equalizer, the center frequency of the delay characteristic, i.e., the peak delay frequency, can be shifted by the phase shifter 11. This equalizer, however, is not very practical because the peak delay time in its delay characteristic can hardly be changed.

FIG. 2 shows in block form a variable delay equalizer of the invention, which comprises directional couplers 20 and 21, and variable phase shifters 22, 23 and 24. The variable phase shifters 22 and 23 are inserted respectively between the output terminals 2 and 3 of the directional coupler 20 and between the input terminals 1' and 4' of the directional coupler 21. The variable phase shifter 24 is inserted between the output terminal 3' of the directional coupler 21 and the input terminal 4 of the directional coupler 20. This variable delay equalizer operates on the following principle.

The transmission coefficients of the directional couplers 20 and 21 are given as:

$$S_{12} = S_{43} = ae^{-j\beta l_1}$$

$$S_{13} = S_{42} = jbe^{-j\beta l_1}$$

$$S_{1'2'} = S_{4'3'} = ce^{-j\beta l_2} \quad (1)$$

$$S_{1'3'} = S_{4'2'} = jde^{-j\beta l_2}$$

where it is assumed that the directional couplers 20 and 21 operate without loss, i.e., $a^2 + b^2 = 1$ and $c^2 + d^2 = 1$, and have equivalent line lengths of $l_1$ and $l_2$ respectively, and that the variable phase shifters 22, 23 and 24 have equivalent line lengths of $l_0$, $l_y$, and $l_x$, respectively, including transmission line lengths between terminals of the directional couplers.

The transmission coefficient of the circuit encircled with the dotted line in FIG. 2 is expressed by Eq. (2), below, on the assumption that matching conditions between the individual terminals are satisfied.

$$S_{12'} = e^{-j\beta(l_1+l_2)} \cdot (ace^{-j\beta l_0} - bde^{-j\beta l_y})$$

$$S_{13'} = je^{-j\beta(l_1+l_2)} \cdot (ade^{-j\beta l_0} + bce^{-j\beta l_y})$$

$$\quad (2)$$

$$S_{42'} = je^{-j\beta(l_1+l_2)} \cdot (ade^{-j\beta l_y} + bce^{-j\beta l_0})$$

$$S_{43'} = e^{-j\beta(l_1+l_2)} \cdot (ace^{-j\beta l_y} - bde^{-j\beta l_0})$$

Equation (2) evidences the fact that the four-terminal circuit 30 encircled with the dotted line serves as a directional branch circuit and thus the coupling to the terminals 2' and 3' can be varied by changing the value $l_y$ with the variable phase shifter 23. The output of the terminal 3' is fed back to the terminal 4 through the variable phase shifter 24 and hence the transmission coefficient S from the input terminal 1 to the output terminal 2' is given as:

$$S = \frac{V_{OUT}}{V_{IN}} = S_{12'} + \frac{S_{13'} \cdot S_{42'} \cdot e^{-j\beta l_x}}{1 - e^{-j\beta l_x} \cdot S_{43'}} \qquad (3)$$

Substituting Eq. (2) for Eq. (3), $$S = e^{-j\beta(l_0 + l_y + 2l_1 + 2l_2 + l_x) - j\pi} \cdot \frac{[1 - e^{-j\beta l_x} \cdot S_{43'}]^*}{1 - e^{-j\beta l_x} \cdot S_{43'}} \qquad (4)$$

where * represents a complex conjugate.
From Eq. (4), the amplitude characteristic is $$|s| = 1 \qquad \qquad 5.$$

In other words, this delay circuit operates without loss, having no frequency characteristic and only the phase being the function of frequency.

The delay characteristic of this circuit is derived from Eqs. (2) and (4) and rearranged as Eq. (6) below.

$$\tau(\omega) \equiv \frac{d}{d\omega}(arg\, S^{-1})$$

$$= \frac{l_1 + l_2 + l_0 + L + \Delta L}{V_p}$$

$$+ \frac{2\{ac(L+\Delta L)\cos\beta(L+\Delta L) - bdL\cos\beta L + abcd(2L+\Delta L)\cos\beta\Delta L - (ac)^2(L+\Delta L) - (bd)^2L\}}{V_p\{1+(ac)^2+(bd)^2 - 2abcd\cos\beta\Delta L - 2ac\cos\beta(L+\Delta L) + 2bd\cos\beta L\}} \qquad (6)$$

where
$$\begin{cases} L = l_0 + l_1 + l_2 + l_x \\ \Delta L = l_y - l_0 \\ V_p: \text{ phase propogation velocity} \end{cases}$$

Figure 4:
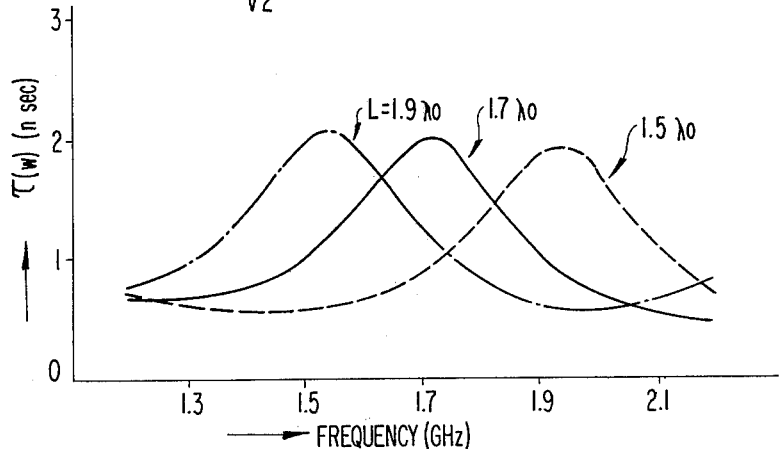

FIGS. 3 and 4 show how the delay characteristic of Eq. (6) is affected by the values $l_y$ and $l_x$ (i.e., $\Delta L$ and L) which are varied by the variable phase shifters 23 and 24

The characteristic curves shown in FIG. 3 are taken for a delay circuit using a 3 dB directional coupler under operation where the center frequency $f_0$ is 1.7 GHz, with the wavelength $L = 1.7$ ($\lambda_0$) kept constant, indicating how $\tau(\omega)$ changes with parameter $\Delta L$. As will be apparent from FIG. 3, no frequency characteristic exists when $\Delta L = 0$, and the maximum value of delay increases with increase in the value $\Delta L$.

FIG. 4 shows delay characteristics taken for a delay circuit using a 3 dB directional coupler at constant wavelength, $\Delta L = 0.1$ ($\lambda_0$), with parameter L varied. It is apparent that the maximum value of delay can be shifted in the frequency direction due to parameter L without appreciably changing the delay of the delay characteristic.

As described above, the variable delay equalizer of the invention is simple in construction, associating directional couplers and variable phase shifters, and yet capable of readily varying the delay value and center frequency in the delay characteristic. Furthermore, a large phase shift can be obtained with a small change in the line length.

While one specific embodiment of the invention has been described in detail, numerous variations may occur to those skilled in the art without departing from the spirit of the invention.

What is claimed is:

1. A variable delay equalizer comprising:
   first and second directional couplers each having a pair of input terminals and a pair of output terminals;
   first and second variable phase shifters inserted respectively between the first output terminal of said first directional coupler and the first input terminal of said second directional coupler and between the second output terminal of said first directional coupler and the second input terminal of said second directional coupler, and;
   a third variable phase shifter inserted between the second output terminal of said second directional coupler and the second input terminal of said first directional coupler.

* * * * *